US012721790B2

(12) United States Patent
Ahmed

(10) Patent No.: US 12,721,790 B2
(45) Date of Patent: Sep. 1, 2026

(54) DEVICES AND METHODS FOR A HYPER REALISTIC BREAST SHAPED SOOTHER

(71) Applicant: Umme Kulsoom Fatima Ahmed, Whitby (CA)

(72) Inventor: Umme Kulsoom Fatima Ahmed, Whitby (CA)

( * ) Notice: Subject to any disclaimer, the term of this patent is extended or adjusted under 35 U.S.C. 154(b) by 327 days.

(21) Appl. No.: 18/307,894

(22) Filed: Apr. 27, 2023

(65) Prior Publication Data

US 2024/0358602 A1 Oct. 31, 2024

(51) Int. Cl.
*A61J 17/00* (2006.01)

(52) U.S. Cl.
CPC ........... *A61J 17/001* (2015.05); *A61J 17/101* (2020.05)

(58) Field of Classification Search
CPC ........ A61J 17/001; A61J 17/101; A61J 17/10; A61J 13/00; A61J 9/005; A61J 9/0676; A61J 9/0607; A61J 11/005
See application file for complete search history.

(56) References Cited

U.S. PATENT DOCUMENTS 4,569,349 A 2/1986 McKee
5,108,686 A 4/1992 Griffin
6,161,710 A 12/2000 Dieringer et al.
D700,344 S 2/2014 Jackson-Berry
9,308,463 B2 4/2016 Bartels
2009/0130944 A1 5/2009 Friedman et al.
2017/0312184 A1 11/2017 Lofaro et al.
2021/0069067 A1* 3/2021 Parry ...................... A61J 13/00
2022/0192930 A1* 6/2022 Bauer .................... A61J 17/111

FOREIGN PATENT DOCUMENTS

CA 2600780 A1 9/2006
GB 2541883 A * 3/2017 .............. A61J 11/02
KR 20140008222 A 1/2014
WO 2009130454 A1 10/2009

* cited by examiner

*Primary Examiner* — Anh T Dang

(57) ABSTRACT

Disclosed herein are devices and methods for initiating bonding with, and comforting and soothing, infants and babies. A soother device comprises a hollow structure, having a top portion and a bottom portion, the bottom portion comprising a suction cup element and the top portion comprising a tip portion, directly opposite from said suction cup element, said top portion being sized and configured to closely resemble a female breast; said top portion being covered by a soft cast component, the soft cast component having a comprising a nipple and areola portion directly over said tip portion. The soother device may suction to smooth surfaces or human bodies to encourage a child to self-soothe without using a mother's breast.

12 Claims, 5 Drawing Sheets

DEVICES AND METHODS FOR A HYPER REALISTIC BREAST SHAPED SOOTHER

FIELD OF THE INVENTION

The present invention relates generally to the field of infant products, and more specifically to soothing, teething, and bonding products for infants and toddlers.

BACKGROUND

Any discussion of the related art throughout the specification should in no way be considered as an admission that such related art is widely known or forms part of common general knowledge in the field.

Currently, teething, soothing, and bonding products are not generally designed as realistic breasts.

Mothers are often inconvenienced and/or experience pain and suffering from babies teething, comfort nursing, and/or cluster feeding.

In the prior art, there may be disclosed products that may prevent cracked or bleeding nipples from breastfeeding, these products do nothing to mitigate babies' desire for their mother's breast.

In the prior art, there may be disclosed products that offer a soother that may have a nipple or breast shape, these products may not encourage self soothing, and furthermore, they may not be able to be worn by either a mother or father to initiate bonding between a parent and child without the pain of breast feeding.

Furthermore, products that are marketed for soothing and/or teething generally do not have the feeling or weight of a realistic breast, enforcing unnatural patterns of accepting the breast—such as biting, or even confusing the child when presented with a real breast, otherwise known as nipple confusion.

When beginning to wean child off the breast, mothers may need a device that acts as a barrier between themselves and their child to prevent nipple stimulation.

Generally, mothers are the only parents able to engage and bond with their child in a skin-to-skin, 'nursing' fashion.

The Canadian breast feeding foundation highlights the importance of skin to skin contact in a parent-child relationship:

https://www.canadianbreastfeedingfoundation.org/basics/skin_to_skinb.shtml

In the prior art, there are disclosed pumps for extracting milk from a mother's breast. These pumps, generally, do not enable skin to skin bonding between a parent and child. Further, they typically require a mechanical pump feature to express milk from a mother's breast.

WO2009130454A1 discloses a method of preparing an artificial breast, the method including forming a three dimensional representation of a breast, forming a mould based on the representation and using the mould to prepare the artificial breast. Also provided is an artificial breast made by the method, and a teat, soother and breast protector comprising the artificial breast. The artificial breast of this invention has shortcomings in that it is generally comparable only to the nipple and areolar region of a breast, and not the whole breast. Furthermore, the method comprises taking a mold of the mother's nipple/areola, meaning that only one artificial breast soother can be made at a time using this method, and the product cannot be produced in large batches. The method may also comprise steps of generating three-dimensional images or a hologram, for generating a mould for producing the teat, which is likely a time consuming process. The device also makes no mention of a suction element for suctioning the artificial teat to a smooth surface or to a human being, which is not a generally obvious addition to make, and would allow a child to self soothe without a parent's help, and without compromising the realistic nature of the artificial breast/teat.

U.S. Pat. No. 9,308,463B2 discloses a suction cup toy for children and associated methods of use thereof, and, more particularly, to a teether, a play toy, a construction toy, and/or a combination teether and toy. The toy may be suctioned to smooth surfaces but has no means of being attached to a human.

US20170312184A1 discloses an artificial nipple is formed of an elastomeric polymer by use of 3D printing after imaging of a mother's breast in an active state of lactation. The artificial nipple is used as an attachment to a baby bottle or as the nipple component of a pacifier. Use of an artificial nipple formed in this manner mitigates a problem with nipple confusion, as may otherwise manifest in newborn offspring. The artificial nipple is generally not compatible with an entire artificial breast, since it requires an attachment component to a bottle or pacifier. Therefore, it likely cannot satisfy a baby's need for the comfort of a mother's breast.

U.S. Pat. No. 4,569,349A discloses a child's teething aid article including a teething portion constructed and arranged in the form of a helical coil spring from a cord-like length of resilient, nontoxic plastic material jacketing a flexible core member. The coil spring has an exterior diameter adapted to be received in the mouth of the child and presents a resilient mechanical force additional to the resilience of the material, against the compressive bite of the child applied normal to the coil spring axis. The teething portion is connected to a one or two part handle portion for manipulation of the article.

U.S. Pat. No. 5,108,686A discloses a nursing device provides a nursing or pacifier nipple for use with nursing infants, and a method for manufacturing such articles. The device comprises an exact replica of the mother's nipple incorporated onto a bottle, specialized dispenser, or pacifier. The nursing device is formed from a mold taken of the nursing mother's natural breast and nipple.

U.S. D 700,344S1 discloses a design for a breast and nipple shaped pacifier. The pacifier does not have the size and shape of a full breast-rather, just a small region around a nipple, and therefore may not satisfy a baby's need for the comfort of a mother's breast.

U.S. Pat. No. 6,161,710A discloses a natural nipple baby feeding apparatus including a detachable inner and outer membranes which both extend substantially across a distance larger than the diameter of a standard baby bottle to which the nipple apparatus may be attached. The membranes have a width approximately double that of the height of the nipple apparatus. The apparatus functions as a training device for an infant by requiring the infant to correctly "latch-on" to the apparatus by grasping the apparatus outwardly of the central nipple area and stretching the outer membrane upwardly so that it contacts the inner membrane which facilitates the flow of fluid from the bottle through both the membranes and out of the nipple. The nipple apparatus may be used in conjunction with, or as an alternative to, breast-feeding of an infant. The apparatus does not mimic a mother's breast, and therefore may not satisfy a baby's need for the comfort of a mother's breast.

CA2600780A1 discloses a custom molded nipple replicating a human nipple for use in both pacifiers and baby bottles, which is provided with a method for molding an exact non-toxic material replica of the mother's breast, nipple and areola area from a mold so that when the replica is filled with a non-toxic gel-like substance and adhered to a backing, the pacifier so created has the firmness, color, rigidity, and texture of the mother's natural breast, nipple, and areola area. Further, the simple to use mold is sent to a core facility which stores the identifying information with the mold once a first pacifier is created therefrom. Moreover, the mother can re-order or re-make the pacifier as needed over time. The pacifier so provided is a safe and effective pacifying device which promotes good emotional, muscular, and bone structure development for the baby, and at the same time, provides the mother with confidence and independence. The apparatus does not mimic a mother's breast, rather just the nipple and areola area of the breast, and therefore may not satisfy a baby's need for the comfort of a mother's breast.

KR20140008222A discloses a nursing bottle for an infant. The nursing bottle comprises a first breast nursing type bottle (A) and second breast nursing type bottle (B) which are combined to each other, wherein a nursing bottle body part (11) and a nipple are similar to the breast of a mother. The nursing bottle uses a silicone rubber to allow a baby to feel as if sucking milk from the mother while nestling in the mother's bosom. The nursing bottle comprises a breast shaped component, however the component is only adaptable to a bottle, for feeding a baby, and is generally not adaptable to use on its own to be comfort or soothe the baby.

All documents cited herein are incorporated by reference.

None of the above cited documents, alone or in combination satisfy the need for devices and methods for hyper realistic, breast shaped soothing, teething and/or bonding products for infants and toddlers that addresses the above-mentioned deficiencies.

BRIEF SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

There is a need for devices and methods for hyper realistic, breast shaped soothing, teething and/or bonding products for infants and toddlers. Some aspects of disclosure provide embodiments of such systems and methods.

In accordance with an aspect of the invention there is provided a soother device for comforting and soothing infants and babies, the soother device comprising a hollow structure, having a top portion and a bottom portion, the bottom portion comprising a suction cup element and the top portion comprising a tip portion, directly opposite from said suction cup element, said top portion being sized and configured to closely resemble a female breast; said top portion being covered by a soft cast component, the soft cast component having a comprising a nipple and areola portion directly over said tip portion.

In accordance with an embodiment of the invention, the nipple and areola portion may comprise a textured nipple and areola element.

In accordance with an embodiment of the invention, the suction cup element comprises a flange suction cup opening, said flange suction cup opening sized and configured to suction said soother device to a smooth surface or to a human body.

In accordance with an embodiment of the invention, the suction cup element comprises a straight edge and a curved edge, directly opposite the straight edge.

In accordance with an embodiment of the invention, the hollow structure is a transparent, bulb vessel having a circular or oval shape.

In accordance with an embodiment of the invention, the transparent spherical vessel comprises a hard silicone or plastic material.

In accordance with an embodiment of the invention, the soft cast component comprises a casting or gel, said casting or gel being soft silicone.

In accordance with an embodiment of the invention, the textured nipple and areola element comprising soft silicone.

In accordance with an embodiment of the invention, the soother device further comprises one or more attachment regions, for attaching one or more accessories.

In accordance with an embodiment of the invention, the accessories comprise comfort, soothing, storage, and travel accessories, for providing additional comfort and soothing to an infant, or for facilitating storage and travel.

In accordance with an embodiment of the invention, the one or more attachment regions comprising a hole, hook and loop fasteners, buttons, and the like.

In accordance with an embodiment of the invention, the accessories further comprise a scent.

In accordance with an embodiment of the invention, a method of weaning a child off of a breast comprises: releasably attaching, by the suction cup element, the soother device, to a human body; and allowing the child to suckle on the textured nipple and areola element of the soother device.

In accordance with an aspect of the invention there is provided a method of preparing a soother device for comforting and soothing infants and babies, the method comprising a first step of preparing a hollow structure having a top portion and a bottom portion, the bottom portion comprising a suction cup element and the top portion comprising a tip portion, directly opposite from said suction cup element, said top portion being sized and configured to closely resemble a female breast, and a second step of covering said top portion with a soft cast component, the soft cast component having a comprising a nipple and areola portion directly over said tip portion.

In accordance with an aspect of the invention there is provided a method of weaning a child off of a breast, the method comprising: releasably attaching, by the suction cup element, the soother device, to a human body, and allowing the child to suckle on the textured nipple and areola element of the soother device.

In accordance with an embodiment of the invention, preparing said hollow structure comprises shaping hard silicone or plastic into said hollow structure.

In accordance with an embodiment of the invention, shaping comprises moulding or 3D printing.

In accordance with an embodiment of the invention, covering said top portion comprises dipping said top portion into a soft silicone gel.

The advantages and features of the present invention will become better understood with reference to the following more detailed description and claims taken in conjunction with the accompanying drawings in which like elements are identified with like symbols.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
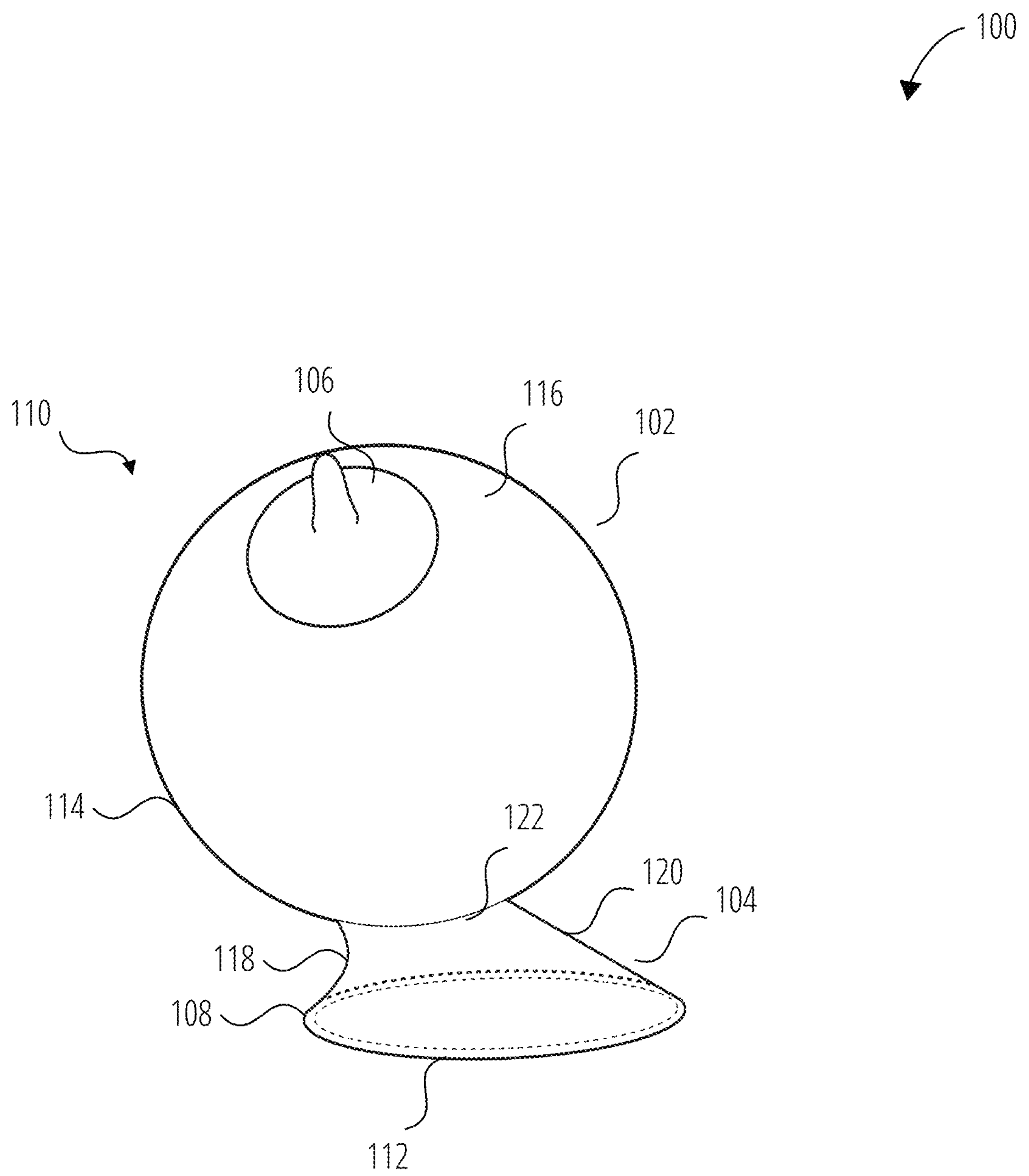

Embodiments will now be described, by way of example only, with reference to the attached figures, wherein the figures:

FIG. 1 illustrates an aspect of the subject matter in accordance with one embodiment.

Figure 2A:
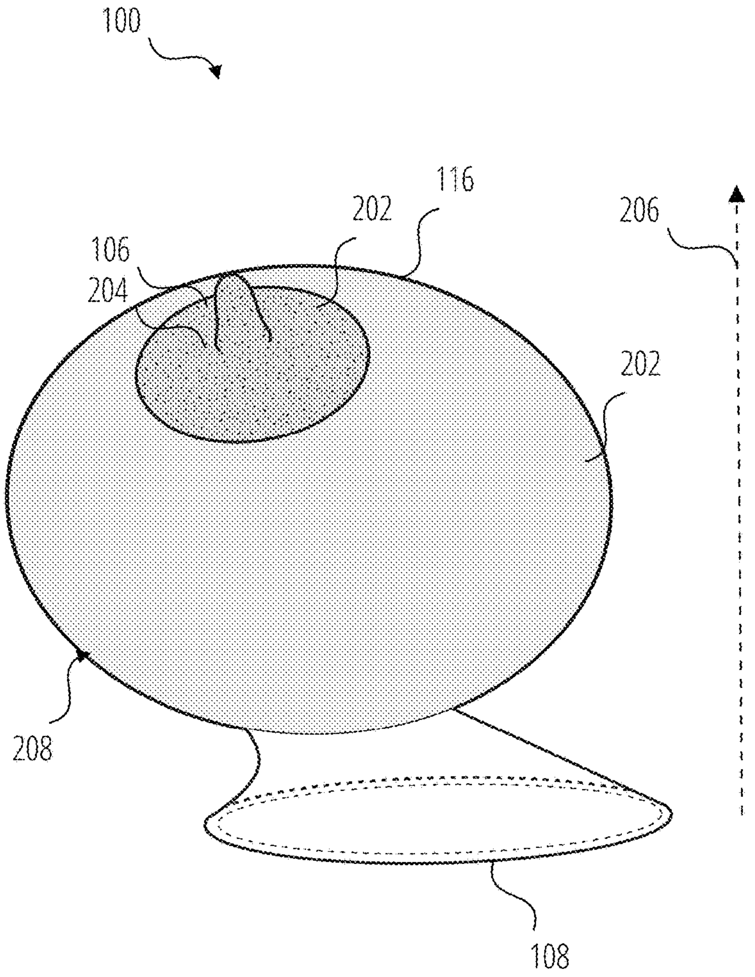

FIG. 2A illustrates an aspect of the subject matter in accordance with one embodiment.

Figure 2B:
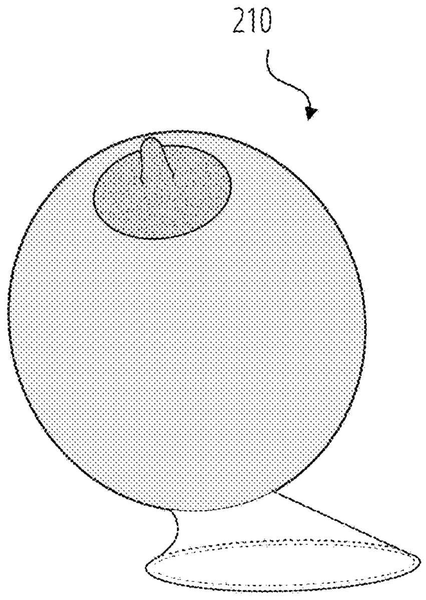

FIG. 2B illustrates an aspect of the subject matter in accordance with one embodiment.

Figure 3A:
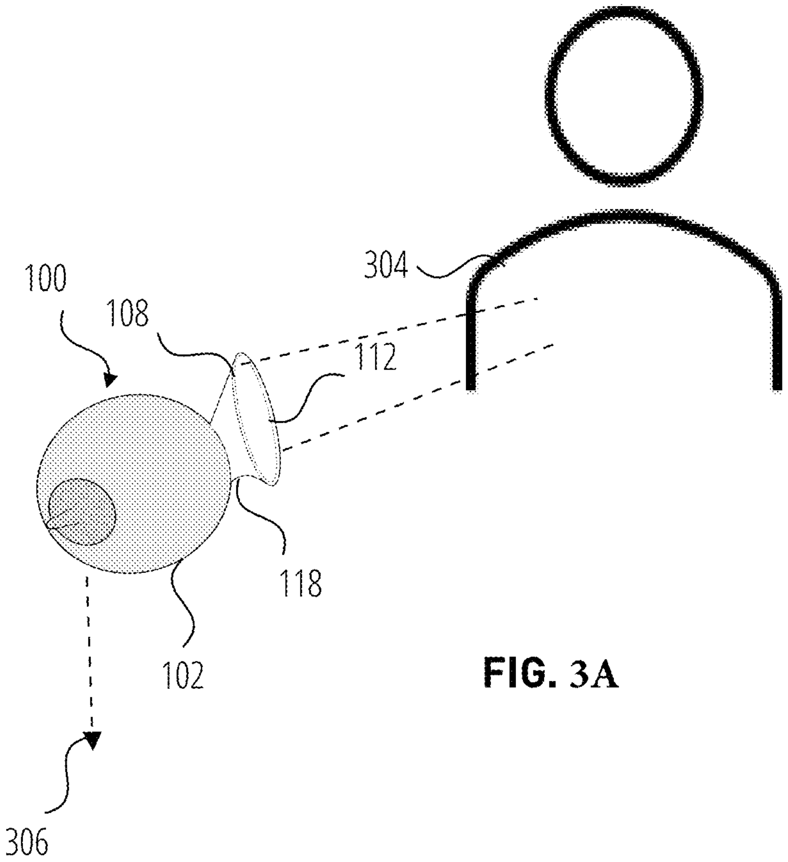

FIG. 3A illustrates an aspect of the subject matter in accordance with one embodiment.

Figure 3B:
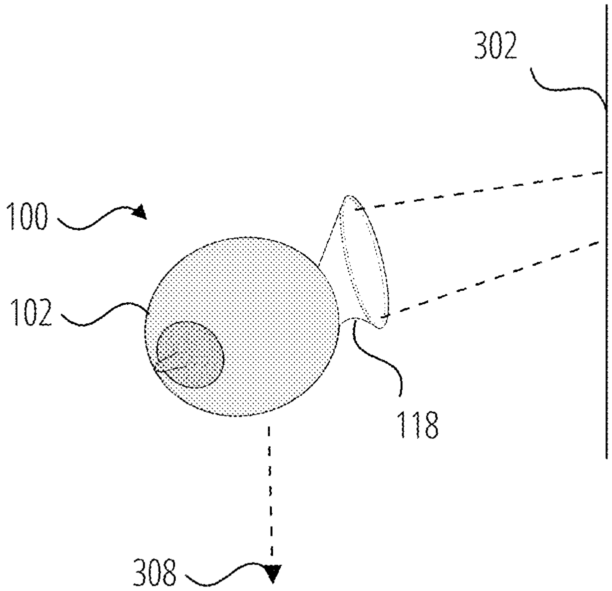

FIG. 3B illustrates an aspect of the subject matter in accordance with one embodiment.

Figure 4A:
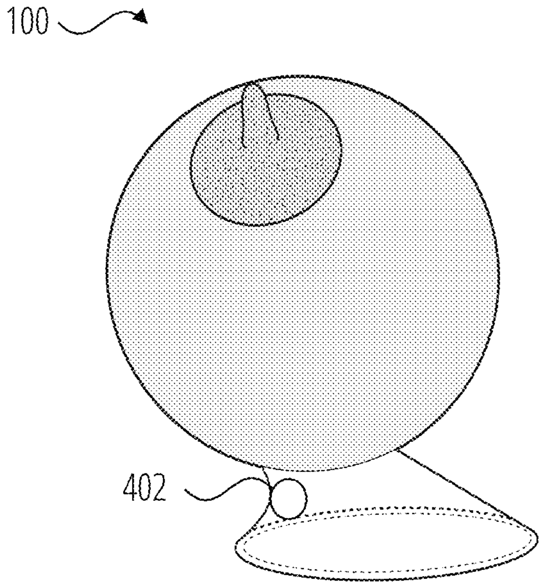

FIG. 4A illustrates an aspect of the subject matter in accordance with one embodiment.

Figure 4B:
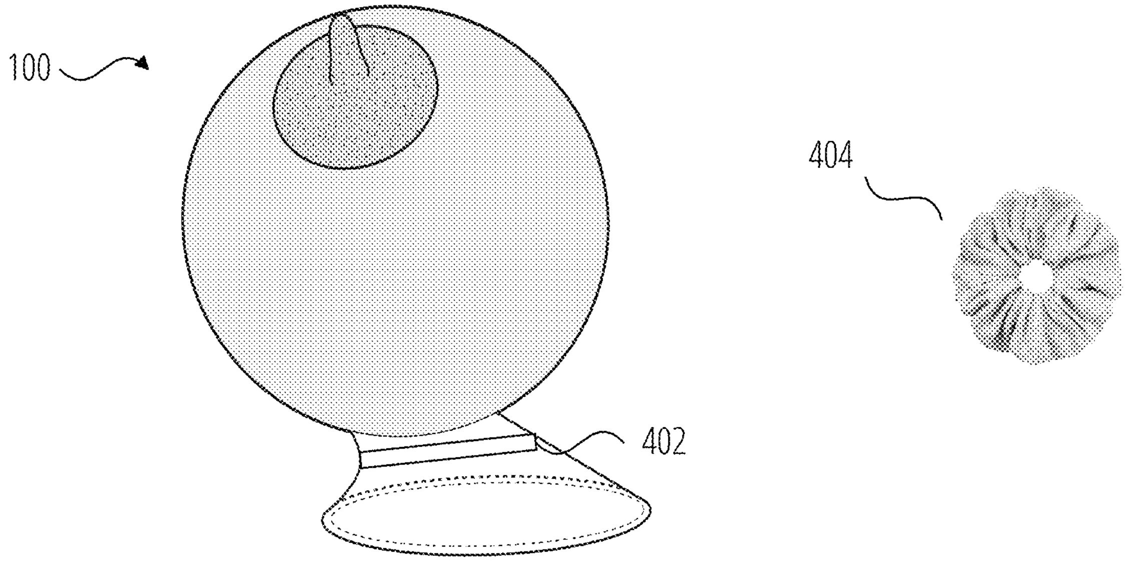

FIG. 4B illustrates an aspect of the subject matter in accordance with one embodiment.

Figure 5:
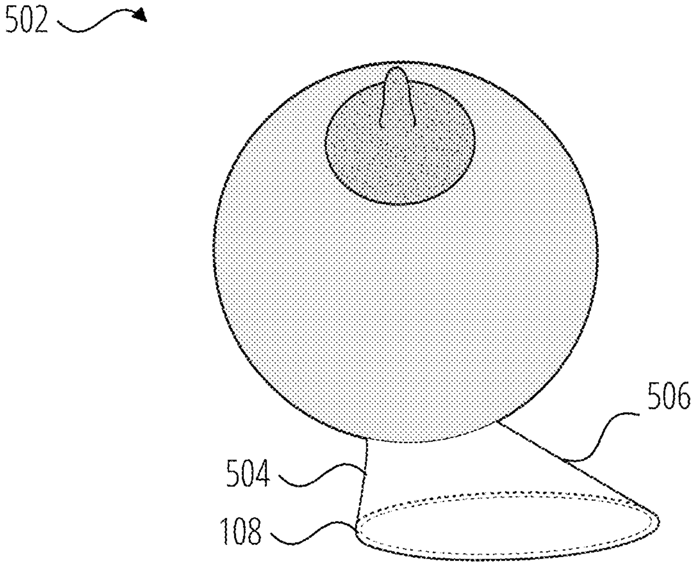

FIG. 5 illustrates an aspect of the subject matter in accordance with one embodiment.

DETAILED DESCRIPTION

The term “connected”, “attached”, “affixed” or “coupled to” may include both direct coupling (in which two elements that are coupled to each other contact each other) and indirect coupling (in which at least one additional element is located between the two elements).

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

Embodiments of a soother device are disclosed herein, which may preferably allow a mother, father, family members to partake in skin to skin contact and bonding.

The soother device may be referred to herein as the “Susu”.

Embodiments of a soother device may preferably be used to either stimulate colostrum or milk production before and after birth of baby. Preferably, the soother device comprises a suction feature, which creates a suctioned vacuum hold that stimulates nipples and breast tissue which sends signals to a mother’s brain to begin milk production.

Embodiments of the Susu may preferably be adjustable for stronger suction in order to stimulate breast tissue for milk production.

Embodiments of the Susu may also comprise a vessel for collection of milk, attachable to, or embedded in, the soother device.

In some embodiments, the soother device may be used to express small amounts of breast milk, in order to mitigate and/or to prevent mastitis, which is the inflammation of breast tissue that sometimes involves infection. This is a common reaction when the breast becomes engorged with milk following weaning a child off of the breast.

In some embodiments, the expression of small amounts of breast milk may enable a mother to bond with their child through skin to skin contact while simultaneously weaning their child. Since the child will be suckling on the Susu instead of mothers breast, women preferably do not have to compromise important and beneficial bonding time while engaging the weaning process.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

FIG. 1 illustrates a soother device 100 for comforting and soothing infants and babies, the soother device 100 comprising a hollow structure 110, having a top portion 102 and a bottom portion 104, the bottom portion 104 comprising a suction cup element 108 and the top portion 102 being sized and configured to closely resemble a female breast, the top portion 102 comprising a tip portion 116, which is covered by a nipple and areola portion 106, directly opposite to said suction cup element 108.

Preferably, the suction cup element 108 further comprises a flange suction cup opening 112, said flange suction cup opening 112 providing a means for suctioning said soother device to a smooth surface or to a human body.

The suction cup element 108 has a generally conical shape, with the flange suction cup opening 112 being sized and configured to encompass a female breast.

The top portion 102 of the hollow structure 110 is generally a transparent, bulb vessel 114, preferably made from a hard silicone or plastic material in the shape of a female breast.

In some embodiments, the top portion 102 has an opening 122 where the top portion 102 connects with the bottom portion 104, allowing for milk to flow from a breast, through the flange suction cup opening 112, through the opening 122, and into the transparent, bulb vessel 114 for storage.

In such an embodiment, when said flange suction flange suction cup opening 112 is suctioned to a breast, milk may flow from the breast into the transparent, bulb vessel 114 for storage.

If desired, milk stored in the transparent, bulb vessel 114 may be transferred to a bottle for feeding an infant.

The transparent, bulb vessel 114 may be spherical, as shown in FIG. 1.

Preferably, the suction cup element 108 comprises a straight edge 120 and a curved edge 118 directly opposite the straight edge 120. The curved edge 118 allows the top portion 102 of the soother device 100 to have some give, such that it leans down towards the curved edge 118 when in use. This is shown in FIGS. 3A and 3B.

FIG. 2A illustrates a soother device 100, wherein the top portion 102 is covered by a soft cast component 202.

The top portion 102 preferably comprises a nipple and areola portion 106, the nipple and areola portion 106 being hollow and connected with the tip portion 116 of the hollow structure 110.

Generally, the textured nipple and areola element 204 are unitary with the soft cast component 202, although it may be preferable to form the textured nipple and areola element 204 from an additional layer on top of the soft cast component 202.

The nipple and areola portion 106 is preferably directly opposite from said suction cup element 108, the nipple and areola portion 106 preferably comprising a textured nipple and areola element 204, shaped and textured to closely resemble a female nipple and areola.

A baby can then be soothed or comforted by sucking on the textured nipple and areola element 204. If they use the textured nipple and areola element 204 for teething, they will find that it has the same texture as a female nipple and areola, and can be discouraged from biting a real female breast.

Generally, the soft cast component 202 comprises a casting or gel, the casting or gel being soft silicone and the like.

In some embodiments, the hollow structure 110 may comprise a vessel for collecting small amounts of milk which are expressed by a mother when the soother device 100 is suctioned to her breast.

A method of preparing the soother device 100 may comprise: a first step of preparing the hollow structure 110, by shaping hard silicone or plastic into said hollow structure.

Preferably, the hollow structure 110 is shaped by moulding or 3D printing material into the transparent, bulb vessel 114 with a top portion 102 and a bottom portion 104, the bottom portion comprising a suction cup element 108 and the top portion 102 being sized and configured to closely resemble a female breast, the top portion 102 comprising a tip portion 116, directly opposite to said suction cup element 108.

The method further comprises a second step of covering the top portion 102 with soft cast component 202, the soft cast component having nipple and areola portion 106 over the tip portion 116, the nipple and areola portion 106 having a textured nipple and areola element 204.

Generally, covering the top portion 102 comprises dipping said top portion 102 into a soft silicone gel.

Preferably, the gel of the top portion 102 enables the soother device 100 to move and change form, similar to how a female breast would.

FIG. 2A illustrates a spherical shape 208 of a soother device 100.

In FIG. 2B, a direction of stretch 206 illustrates a stretch and/or give of the soother device 100, to a more elongated shape 210.

Alternatively, if preferred, the soother device 100 may be moulded into an elongated shape 210.

In cases where the soother device 100 is suctioned to a surface, a spherical shape 208 may be preferable.

Generally, the spherical shape 208 is a sturdier shape, which keeps infants from pulling the soother device 100 away from a surface.

FIGS. 3A and 3B illustrate various uses of the soother device 100.

If a child is nursing for comfort rather than feeding, the soother device 100 may act as a comforting alternative to a mother's breast.

The soother device 100 may be suctioned directly to a human body 304.

The soother device 100 can act as a nipple protection device for protecting nipples during cluster feeding or comfort nursing, where a child feeds, nurses, or self-soothes on a breast constantly. This can lead to discomfort and nipple chafing for mothers. The flange suction cup opening 112 may fit directly over a female breast to protect a mother's nipple from chafing during comfort nursing.

Alternatively, the soother device 100 may be suctioned to a male chest. A child may be soothed by the soother device 100 while experiencing closeness and comfort from their father.

A user suctions the flange suction cup opening 112 to a human body 304 by squeezing the suction cup element 108 and placing the flange suction cup opening 112 over a breast or onto a chest.

Embodiments of a soother device 100 may preferably be used to either stimulate colostrum or milk production before and after birth of a baby. Preferably, the soother device 100 comprises a suction cup element 108. The flange suction cup opening 112 of the suction cup element 108 preferably creates a suctioned vacuum hold that may preferably stimulate nipple and breast tissues, which may send signals to a mother's brain to begin milk production.

In some embodiments, the flange suction cup opening 112 of the suction cup element 108 may preferably be adjustable for stronger suction to a breast, in order to stimulate breast tissue for milk production.

Embodiments of the Susu may also comprise a vessel for collection of milk. This vessel may simply be the transparent, bulb vessel 114 of the hollow structure 110.

In some embodiments, the soother device 100 may be used to express small amounts of breast milk by strongly suctioning to the breast and stimulating the breast tissue for milk production, in order to mitigate and/or to prevent mastitis, which is the inflammation of breast tissue that sometimes involves infection. This is a common reaction when the breast becomes engorged with milk following weaning a child off of the breast.

In such an embodiment, the suction cup element 108 is preferably in fluid communication with the transparent, bulb vessel 114 of the hollow structure 110. In this manner, milk may flow from a breast into the transparent, bulb vessel 114 for storage.

The suction cup element 108 may suction directly to a smooth surface 302. A smooth surface 302 may comprise a wall, a crib, a floor, and the like. This enables a child to self-soothe, without needing to be held or comforted by a parent.

A child can press the soother device 100 firmly onto any smooth or flat surface 302, securing the device 100 before using it for soothing.

Preferably, the suction cup element 108 comprises a straight edge 120 and a curved edge 118 directly opposite the straight edge 120.

When suctioning the soother device 100 to a wall or to a person, it may be preferable to orient the soother device 100 such that the curved edge 118 is facing towards the ground.

When the curved edge 118 faces towards the ground, the top portion 102 hangs or gives slightly towards the ground in a direction of hang 306, shown by a directional arrow 306.

The soother device 100 when used in this manner, more closely resembles a female breast than devices in the prior art.

FIGS. 4A and 4B illustrate embodiments of the soother device 100.

FIG. 4A illustrates a soother device comprising one or more attachment regions 402 configured to attach one or more accessories 404 to the soother device. In this embodiment, attachment region 402 may preferably, but need not necessarily, be a hole, for releasably hooking or tying an accessory to the soother device.

FIG. 4B illustrates a soother device comprising one or more attachment regions 402, configured to attach one or more accessories 404 to the soother device. In this embodiment, the attachment region 402 may preferably, but need not necessarily, be a hook and loop fastener, for cooperatively and releasably attaching the accessory 404 to the soother device.

The soother device 100 may further comprise one or more attachment regions 402, for attaching one or more accessories 404.

The one or more attachment regions 402 may comprise releasable attachment units, for example, a hole, hook and loop fasteners, buttons, and the like, for releasably attaching one or more accessories 404 to the soother device.

Alternatively, the one or more attachment regions 404 may comprise permanent attachment units, for example, glue, stitching, moulding, and the like, for permanently attaching one or more accessories 404 to the soother device.

The accessories 404 may comprise comfort, soothing, storage, and travel accessories, for providing additional comfort and soothing to an infant, or for facilitating storage and travel. For example, comforting accessories 404 may comprise a hair tie or scarf.

The accessories 404 may further comprise a scent, including a natural scent from a parent, or a scent additive such as perfume.

Storage and travel accessories 404 may comprise a lanyard, a keychain, and the like, for hanging the soother device 100.

The soother device 100 may be secured with a lanyard to cribs and strollers, for example, for hands-free use.

FIG. 5 illustrates an embodiment of a soother device 502, where the suction cup element 108 comprises a first straight edge 504 and a second straight edge 506.

In this embodiment, the top portion 102 generally does not hang towards the ground when suctioned to a human body 304 or a smooth surface 302.

The soother device 100 may preferably be hyper-realistic breast that acts as a soother or teether for infants and toddlers.

The soother device 100 may also be used to wean a child off of a mother's breast as they get older. It may be offered as a replacement for a child, allowing a mother to comfortably transition nursing time into bonding time. A mother can then slow down milk production.

The soother device 100 preferably allows for both parents to partake in crucial bonding with the infant. According to the Breast Feeding Foundation of Canada, babies breathe better whilst maintaining skin-to-skin contact with their mother or father. Studies have shown that this contact maintains baby's body temperature, heart rate, respiratory rate and blood pressure levels. It also improves blood sugar levels in baby and prepares them for life outside the womb.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The foregoing descriptions of specific embodiments of the present invention have been presented for purposes of illustration and description. They are not intended to be exhaustive or to limit the invention and method of use to the precise forms disclosed. Many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A soother device for comforting and soothing infants and babies, the soother device comprising:

a hollow structure, having a bottom portion and a top portion directly opposite the bottom portion;

the bottom portion comprising a suction cup and the top portion comprising a tip portion and a nipple and areola portion directly over said tip portion, the suction cup operative to secure the bottom portion to a surface;

the top portion being sized and configured to closely resemble a female breast; and, the top portion covered by a soft cast component;

wherein the suction cup comprises a straight edge and a curved edge directly opposite the straight edge, wherein the curved edge is operative to enable the soother device to hang downward towards the curved edge, mimicking a human breast, when the suction cup is secured to a substantially vertically oriented surface and the soother device extends horizontally away from the substantially vertically oriented surface.

2. The soother device of claim 1, wherein the nipple and areola portion comprises a textured nipple and areola element.

3. The soother device of claim 2, the textured nipple and areola element comprising soft silicone.

4. A method of weaning a child off of a breast, the method comprising:

releasably attaching, by the suction cup, the soother device of claim 2, to a human body;

allowing the child to suckle on the textured nipple and areola element of the soother device of claim 2.

5. The soother device of claim 1, wherein the suction cup comprises a flange suction cup opening, said flange suction cup opening sized and configured to suction said soother device to a smooth surface or to a human body.

6. The soother device of claim 1, wherein the hollow structure is a transparent, bulb vessel having a circular or oval shape.

7. The soother device of claim 6, wherein the hollow structure comprises a hard silicone or plastic material.

8. The soother device of claim 1, wherein the soft cast component comprises a casting or gel, said casting or gel being soft silicone.

9. The soother device of claim 1, further comprising one or more attachment regions, for attaching one or more accessories.

10. The soother device of claim 9, further comprising at least one accessory, the the at least one accessory comprising one or more of comfort, soothing, storage, and travel accessories, for providing additional comfort and soothing to an infant, or for facilitating storage and travel.

11. The soother device of claim 10, wherein the accessories further comprise a scented accessory, the scented accessory comprising one of: a natural scent from a parent and a scent additive.

12. The soother device of claim 9, the one or more attachment regions comprises one or more of: a hole, hook and loop fasteners, buttons.

* * * * *